July 11, 1967 K. F. TRAGER 3,330,754
ELECTROCHEMICAL TREPANNING APPARATUS
Filed July 6, 1966 4 Sheets-Sheet 1

INVENTOR.
KEMPES F. TRAGER
BY
Bower & Patalidis
ATTORNEYS

July 11, 1967

K. F. TRAGER 3,330,754

ELECTROCHEMICAL TREPANNING APPARATUS

Filed July 6, 1966

INVENTOR.
KEMPES F. TRAGER
BY
Bower & Patalidis
ATTORNEYS

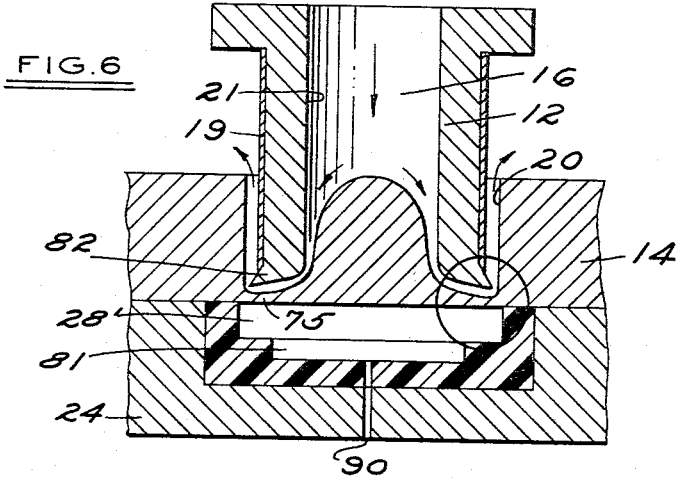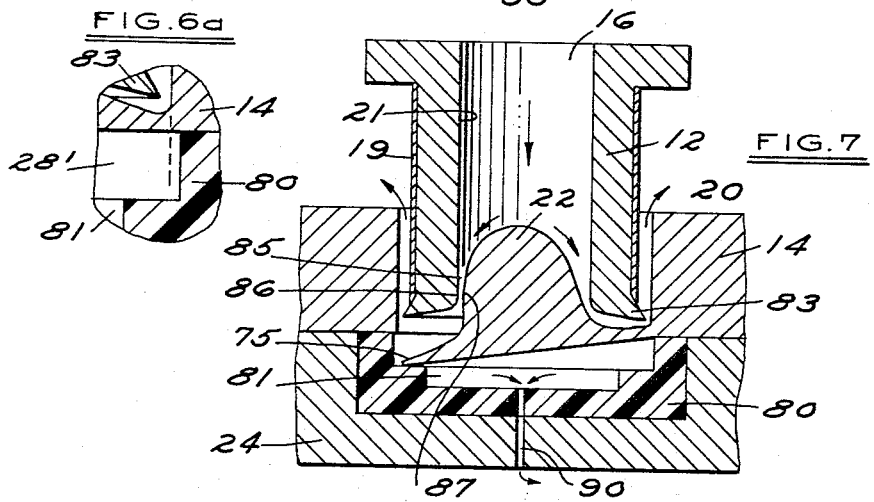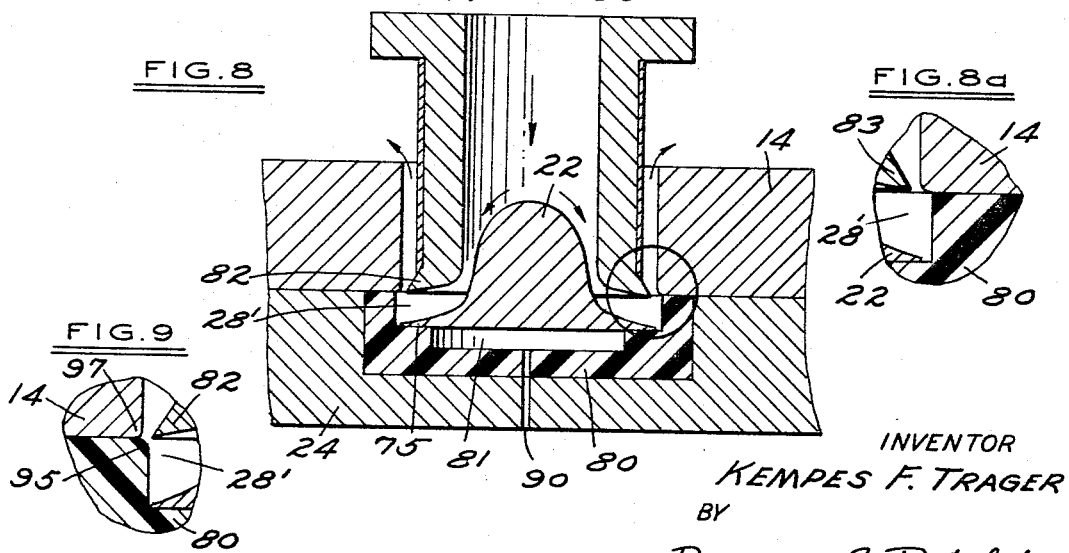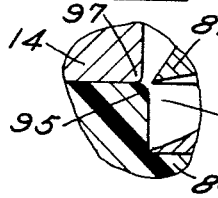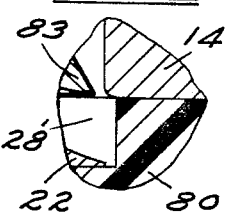

United States Patent Office 3,330,754
Patented July 11, 1967

3,330,754
ELECTROCHEMICAL TREPANNING APPARATUS
Kempes F. Trager, Detroit, Mich., assignor to Ex-Cell-O
Corporation, Detroit, Mich.
Filed July 6, 1966, Ser. No. 563,232
3 Claims. (Cl. 204—224)

This application is a continuation-in-part of application Ser. No. 249,906, filed Jan. 7, 1963, now abandoned.

This invention relates in general to electrochemical machining, and particularly to methods for successfully performing electrochemical trepanning operations. Electrochemical machining of metalloids, sometimes called electrolytic machining, is coming into extensive use because of its ability: to machine any conductive metalloid; to machine metalloids that are not readily machinable by ordinary methods or conventional cutting tools, while still obtaining substantially high surface finish free from burrs; to produce articles free of residual stresses and metallurgical charges; and to machine three-dimensional shapes with a single-axis movement.

It is now well known that electrochemical machining consists in advancing an electrode tool toward and into a workpiece while electrolyte is supplied under pressure to the interface between the working face of the electrode tool and the workpiece. A direct current source of low potential but high amperage capacity is connected to the electrode and the workpiece in a sense to make the electrode a cathode and the workpiece an anode. The electrolyte action thus produced rapidly removes material from the anodic workpiece in front of the advancing electrode tool.

Among the major utilizations of electrochemical machining are trepanning operations, that is, the sinking of a cylindrical or irregular shaped cavity by means of a hollow thin-walled electrode in such a way that a core or slug of workpiece material is severed when the hollow tool traverses all the way through the workpiece. This core or slug of metalloid may or may not be the finished article.

The possibility of a damaging short circuit between the cathodic tool and the anodic workpiece exists in all electrochemical operations, but especially in electrochemical trepanning operations. A short circuit can occur when a hollow electrode breaks partially through the remote side of a workpiece, permitting the electrolyte to flow suddenly through the workpiece and creating an electrolyte shortage or starvation at the gap between the electrode tool face and the remaining metal in the cavity. Consequently, the electrode tool advances at a faster rate than the metal can be eroded away from the workpiece, causing a short circuit when contact is made between the electrode tool face and the workpiece. Also a short circuit can occur when the electrode breaks partially through the remote side of a workpiece, allowing the partly severed slug or core to be cocked against an interior surface of the hollow electrode resulting in a short circuit at that point. These problems are solved by the present invention by the means hereinafter described.

An object of the invention, therefore, is to provide method and apparatus to prevent short circuits in electrochemical trepanning operations.

Another object of the invention is to provide for more efficient metal removal as a trepanning electrode tool emerges through a hole in a workpiece.

A further object of the invention is to provide methods and apparatus for preventing a slug obtained by electrochemical trepanning of a workpiece from becoming dislodged and thereby interferring with the machining process and causing a short circuit.

Various other objects and advantages will appear from the following description of several embodiments of the invention, and the novel features will be particularly pointed out hereinafter in connection with the appended claims.

Although the invention is disclosed as it pertains to electrochemical machining, it will be obvious to those learned in the art that the methods and apparatus herein described can be easily adapted to solve similar problems in trepanning operations by means of electrical discharge machining, sometimes called spark machining.

In the drawings, wherein like numerals refer to like or equivalent elements:

FIGURE 5b is a bottom view of the electrode tool shown in FIGURE 5a;

FIGURE 6 is a modified embodiment of the present invention;

FIGURE 6a is a magnified view of a section of FIGURE 6 showing the relationship of the tool and the workpiece;

FIGURE 7 and FIGURE 8 shows the relationship between the tool and the workpiece;

FIGURE 8a shows a magnified view of the section of FIGURE 8 showing the relationship of the tool and the workpiece;

FIGURE 9 shows a modification of the slug catcher of FIGURES 6-8.

Figure 1:
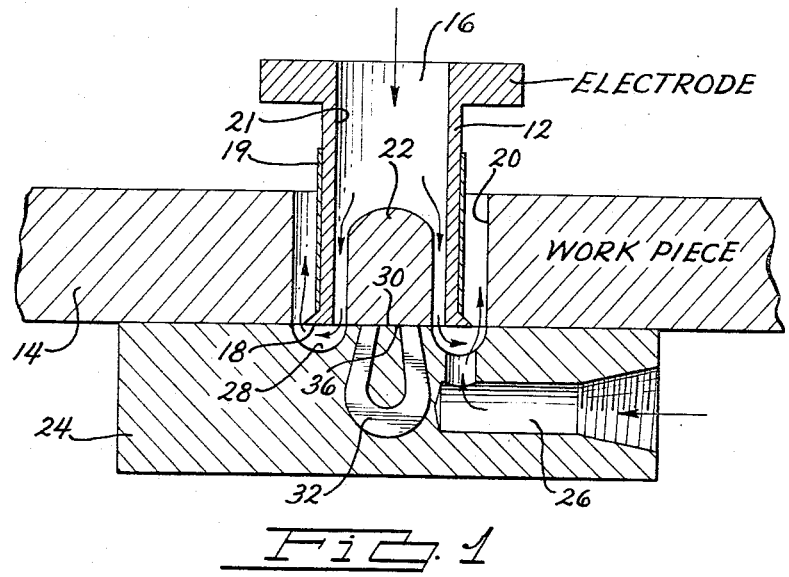
FIGURE 1 is a schematic sectional view of an example of structural embodiment according to the teachings of the present invention.

Referring now to the drawings, and more particularly to FIGURE 1 thereof, in the course of a typical trepanning operation by electrochemical process a hollow electrode tool 12 electrically connected to the negative terminal of direct current source by appropriate means (not shown) is advanced slowly into a workpiece 14, connected to the positive terminal of the current source by appropriate conductors (not shown) while electrolyte is forced under high pressure through a passageway 16 in the hollow electrode tool. The electrolyte is thus caused to flow across the interface between the advancing working face 18 of the electrode tool and the receding corresponding surface of the workpiece being eroded away by the electrochemical process.

The electrode tool is preferably coated on its outside surface with an adhering film 19 of a material which is a good electrical insulator to prevent electrolysis of the side walls 20 of the cavity being formed in the workpiece, according to a technique which is well known to the art. When it is desired to prevent electrolysis of the slug, the inner surface 21 of the electrode tool may also be coated in a similar manner.

When the electrode tool 12 has penetrated the workpiece to the position illustrated in FIGURE 1, a slug or core 22 is caused to be severed from the workpiece. In most instances, the slug is not separated from the workpiece all at once, and some portions of the bottom of the workpiece cavity are eroded away first, affording an escape passage for the electrolyte and causing a drop of electrolyte pressure and electrolyte starvation at the interface. Due to this electrolyte starvaiton at the interface, the workpiece cavity is not eroded at as fast a rate as the electrode tool is advancing and a short circuit occurs when the two make contact.

To prevent this from occurring, a back-up member 24 is disposed under the workpiece 14, as shown in the drawing, and electrolyte under pressure is supplied, by means of a passageway 26, to a clearance recess 28, on the back-up member 24, the shape of the recess corresponding to the shape of the electrode tool working face 18. Thus, there will be an adequate supply of electrolyte to the remaining interface when the electrode tool has broken partially through the bottom of the workpiece.

The clearance recess 28 surrounds an area 30 of the back-up member which corresponds to and forms a support for the slug 22. A magnet 32, which may be either a permanent magnet or an electromagnet, is disposed in the back-up member 24 under the slug 22, and attracts the slug and holds it in position, thus preventing the slug from being dislodged or cocked in such a manner as would cause a short circuit to occur by contact between the slug and a portion of the inner surface 21 of the electrode tool. This method may be used in conjunction with any magnetically attracted workpiece material and is very simple and economical in application. Furthermore, the use of a magnetic slug holding device is readily adaptable to any size slug.

Figure 2:
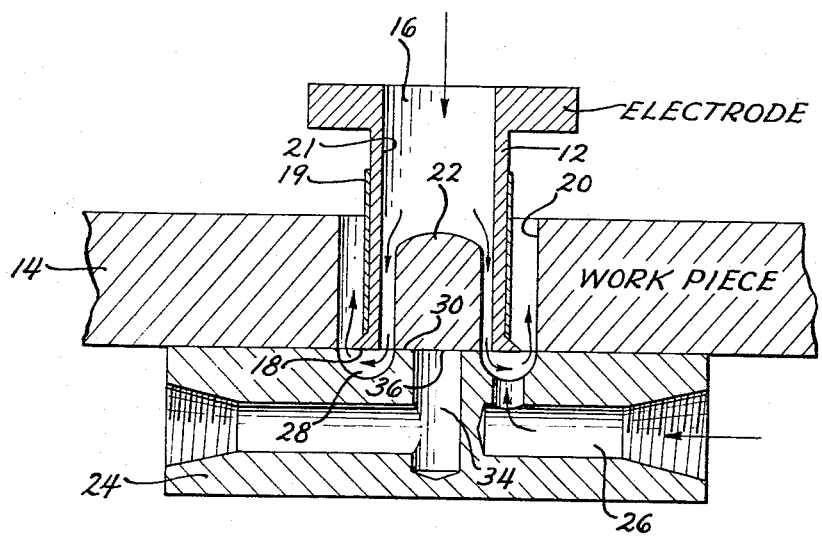
FIGURE 2 is another example of structural embodiment of the present invention shown in a schematic sectional view.

FIGURE 2 illustrates a modification of the invention designed to hold the slug in position, even though the material of the workpiece cannot be attracted by a magnet. A bore 34, slightly smaller than the bottom area of the intended slug 22, is provided in the back-up member 24 and is ducted to a vacuum pump, to the suction side of the electrolyte pump (not shown), or to the atmosphere. The lower pressure or vacuum created at the underface 36 of the slug 22 is translated into a downward force on the slug so that, when the slug is severed from the workpiece, this force immobilizes the slug and holds it in its proper orientation, preventing the possibility of the slug making contact with the cathode tool. A rubber, plastic, or the like, gasket (not shown) may be disposed imbedded in the area 30 around the inlet of bore 34, thereby effecting a better seal between said inlet and the underface 36 of the slug.

Figure 3:
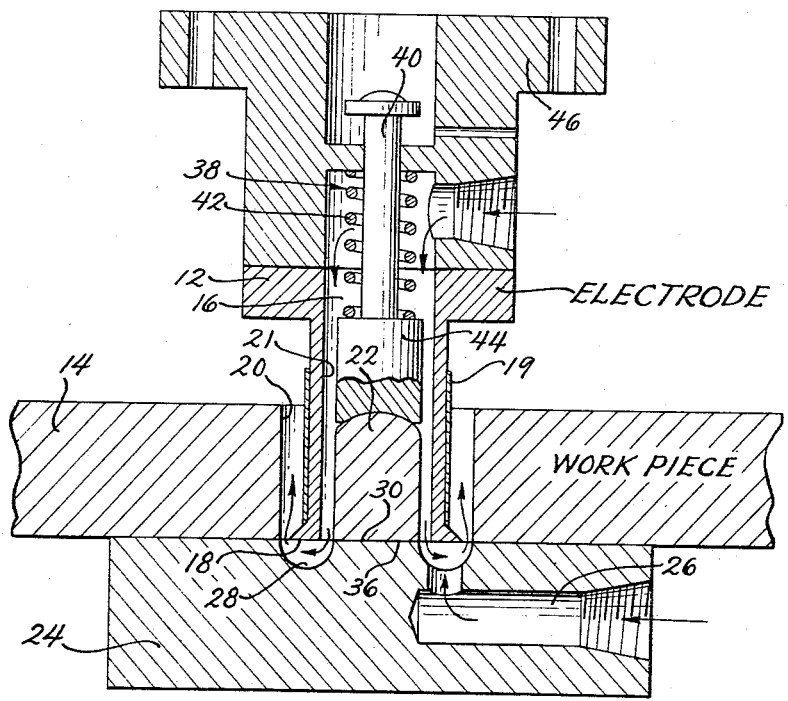
FIGURE 3 is another example of structural embodiment of the present invention shown in a schematic partial sectional view.

FIGURE 3 illustrates another example of the invention which uses a spring loaded plunger, designated generally by numeral 38, that exerts a biasing force on the slug 22 to hold it securely against the area 30 of the back-up member 24 after the slug has been severed from the workpiece 14. A plunger rod 40 having a compression spring 42 mounted about it and provided with an attached non-conducting head 44 is mounted slidably in electrode tool holder 46, so that when the electrode tool 12 is advanced into the workpiece, the spring loaded plunger 38 exerts a downward force on the slug 22 and clamps it to back-up member 24 as the spring 42 is compressed. This downward force holds the slug in position when it is finally severed from the workpiece. In this example, the plunger head 44 is composed of a non-conducting material so as not to create a short circuit between the cathodic electrode tool 12 and holder 46 and the anodic workpiece, but it is understood that other means of insulating the plunger apparatus can be used. This method is best utilized with large cylindrical slugs of any metalloid material.

Figure 4:
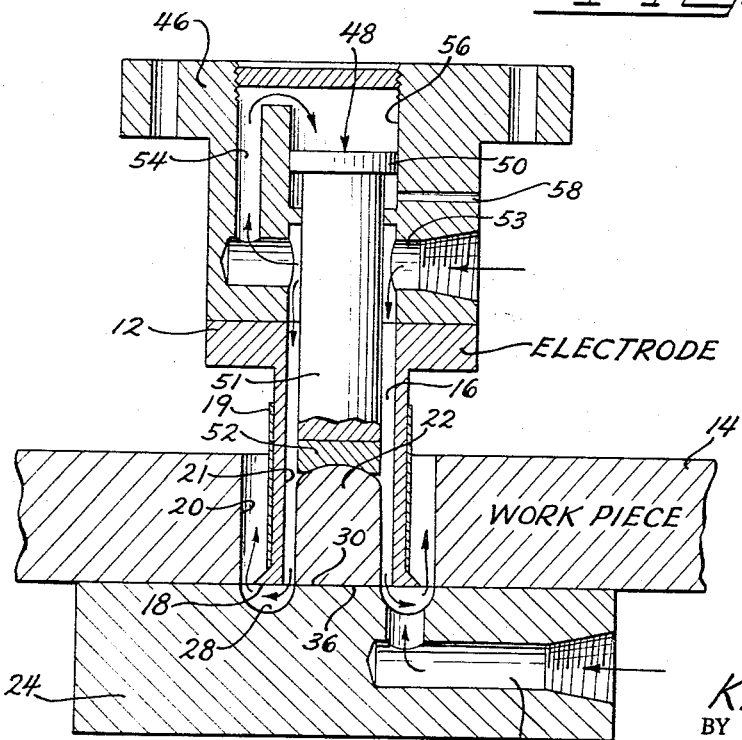
FIGURE 4 is another example of structural embodiment of the present invention shown in a schematic partial sectional view.

The embodiment of the invention as illustrated in FIGURE 4 represents a modification of the example shown in FIGURE 3 in that the spring loaded plunger is replaced by an electrolyte pressure loaded plunger to accomplish the same end of holding the slug in place. A plunger 48, having a piston head 50 and a cylindrical plunger body 51 capped with a non-conducting tip 52, is slidably mounted in electrode holder 46. The highly pressurized electrolyte entering the hollow cathode tool 12 through inlet 53 in tool holder 46 is caused, via channel 54 in fluid communication with cylinder 56, to act on piston head 50 forcing the tip 52 of the plunger body 51 to clamp the slug 22 against the area 30 of the back-up member 24. A vent orifice 58 is provided to the ambient as relief for any electrolyte that seeps past the piston head 50. The force exerted on the piston head and plunger by the electrolyte is more than ample to clamp the slug 22 against the back-up member 24 after it is severed from the workpiece. The plunger body 51 is provided with a tip 52 made of a non-conducting material, as hereinbefore mentioned, so as not to cause a short circuit between the anodic slug 22 and the cathodic electrode tool 12 and holder 46. It is noted that other means of insulation could easily be provided as a substitute for the non-conducting plunger tip as shown. This method can be used with any metalloid material and is most readily adapted for use with cylindrical slugs.

Figure 5:
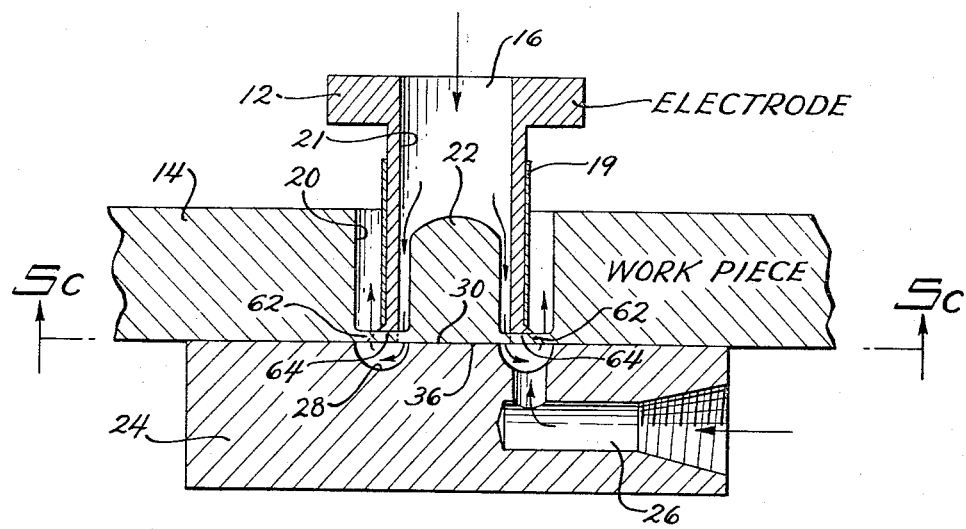
FIGURE 5 is another example of structural embodiment of the present invention shown in a schematic sectional view.
Figure 5C:
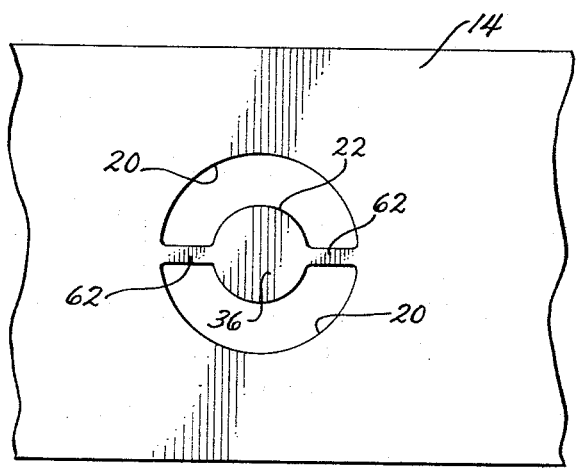
FIGURE 5c is a partial plan view of a completed workpiece obtained by means of the apparatus illustrated in FIGURE 5.
Figure 5A:
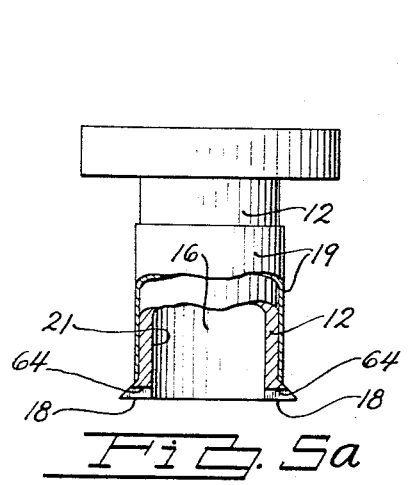
FIGURE 5a is an elevational view of the electrode tool utilized in the embodiment of FIGURE 5.
Figure 5B:
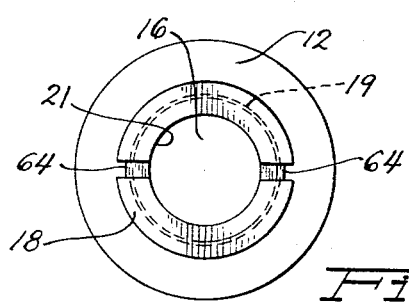

FIGURES 5 through 5c illustrate still another means of maintaining the slug in its proper orientation at the critical point of a trepanning operation. This embodiment of the invention makes use of small supports ribs or bridges 62 of metal left between the slug and the workpiece when the trepanning operation is completed. The electrode tool 12, as shown in elevation in FIGURE 5a and in bottom view in FIGURE 5b, has several small recessed notches 64 provided around the electrode working face 18 so that, when the electrode has broken through the remote side of the workpiece, several small support ribs 62 corresponding to notches 64 will remain between the slug and workpiece. The workpiece with the slug still in its original position as shown in FIGURE 5c, is removed from the fixture and the slug and support ribs are knocked out with light hammer blows. This method is readily adaptable to the machining of irregular and complicated shapes in any metalloid material, is very simple, and requires little or no extra tooling expense.

It can be seen that in the working of the process by the means of FIGURES 5–5c, the back-up member may be omitted as the support ribs or bridges 62 afford sufficient support for the slug 22.

In every illustration of the invention shown in FIGURES 1 through 5–5c there is shown a back-up member 24 provided with a recess 28 conforming to the shape of the electrode tool working face 18. The recess 28 is placed in communication with pressurized electrolyte by way of a passageway 26 for the purpose of avoiding electrolyte starvation at the tool workpiece interface, as hereinbefore explained. It is to be understood that in some electrolytic trepanning operations it would be feasible to dispense with feeding electrolyte to the recess 28 if certain precautions are taken, such as a slight reduction of the electrode tool feed rate, for example, at the end of the operation. Also, it is to be understood that the recess 28 can be dispensed with, without departing from the spirit and scope of the invention. During a production run of a series of similar parts, a recess will generally be machined away from a plain back-up member by the tip of the cathode tool emerging through the workpiece at the end of the trepanning operation effected on the first part of the run.

FIGURES 6, 7, and 8 show a modification of the invention which uses the force of the electrolyte fluid flowing through the passageway 16 in the hollow electrode tool 12 to hold the core or slug 22 when it breaks away from the workpiece 14. As mentioned previously electrolyte is forced under high pressure through the passageway 16 across the interface between the advancing working face 18 of the electrode tool and the receding corresponding surface of the workpiece being eroded away by the electrochemical process. The electrode tool is preferably coated on its outer surface with a dielectric film 19 to prevent electrolytic erosion of the side walls 20 of the cavity being formed in the workpiece 14.

FIGURE 6 shows the electrode tool 12 as it nears the bottom of the workpiece. A back-up member 24 is disposed beneath the workpiece 14. The back-up member includes a core or slug catcher 80 made of dielectric substance, such as, glass, nylon, plastic or other non-conductive substance. Disposed on the dielectric core or slug catcher 80 and adjacent to the bottom edge of the workpiece, a recess 28′ is machined slightly larger than the size of the slug 22. That is, the dimensions of the opening in the workpiece is called the "print size" of the part. The electrode tool is made minus "print size" and varies from .006 to .012 per side of electrode tool. Therefore, when the part is machined it will cut to "print size." The core or slug catcher 80 is made slightly oversize with respect to the width of the slug 22 as shown in FIG. 6a. The reason for the use of a dielectric slug catcher is evident from the views of FIGURES 6, 7 and 8. As the edge 82, which can be made dimensionally different than the edge 83 by a thousandth of an inch or more, electrolytically erodes away the remaining portion 75 of the slug 22, the edge of slug 22 drops into the recess 28′. Ordinarily, at this time, any slight misalignment is likely to cause a short circuit. However, since the slug catcher 80 is made of a dielectric substance, no short circuit occurs. Moreover, it is well apparent that the recess 28′ cannot be too deep or the edge 75 of the slug 22 will drop too far causing a short circuit at the gap 85 between the inside edge 86 of the tool 12 and the surface 87 of slug 22. In other words the working face of the electrode tool must slant from its outer edge to its inner edge at an angle of five to ten degrees (5°–10°). This will allow the slug to retain its maximum diameter and still provide a maximum clearance at the gap 85 when one edge of the slug is machined away and resting on the slug catcher 80, as shown in FIGURE 7.

FIGURE 8 shows the position of the slug 22 when resting within the recess 28′ of the dielectric slug catcher 80. A second recess 88 is provided in the slug catcher 80 to maintain the slug 22 in its break-away position by virtue of well known laws of physics as explained hereinafter. The vent hole or orifice 90 is exited to the atmosphere. Consequently, the force of electrolyte flowing through the passageway 16 of electrode tool 12 impinges upon the slug 22 holding it down in the recess 28′. A small amount of electrolyte that leaks under the slug will be vented to atmosphere however, the greater fluid pressure of electrolyte holds the slug down in the recess 28′. In other words, the exit flow of electrolyte through orifice 90 is less then the flow of electrolyte through the passageway of the electrode tool, thereby the force of the electrolyte holds the slug down in the recess 28′.

As shown in FIGURE 8a, the magnified view of the recess 28′ and the bottom edge surface of the workpiece shows that in providing for the recess to be slightly larger than the "print size" of the hole in the workpiece results in the edge to be deburred.

A further modification, as shown in FIGURE 9, is to provide for the recess 28′ of slug catcher 80 to be the same size as the electrode tool, as explained above. That is, the recess will be made minus print size. However, slug catcher 80 is rounded at the edge adjacent the workpiece such as shown at 95 in FIGURE 9. The rounded edge undercuts the edge of the workpiece 14 and therefore allows the edge 97 of the workpiece 14 to be deburred. However, it is well understood that there exists many other variations and modifications that can effect the same results hereinabove described.

It is seen from the methods and apparatus heretofore described, that the problem of short-circuits in electrochemical trepanning operations has been solved by the use, when necessary, of a recess and pressurized electrolyte supply in the back-up member, and by the use of means to hold the slug in its original position after the electrode breaks through the remote side of the workpiece.

It will be understood that the directions and orientations, such as up or down, top or bottom, mentioned in the above description refer only to the attached drawings and will not necessarily be the same in actual applications of the invention.

It will be also understood that various changes in the details, materials, steps, and arrangements of parts, which have been herein described and illustrated in order to explain the nature of the invention, may be made by those skilled in the art within the principle and scope of the invention as expressed in the appended claims.

What is claimed is:

1. In an electrochemical trepanning apparatus, comprising:
    (a) a hollow electrode tool having at least one electrolyte passage therethrough for supplying electrolyte fluid under pressure and adapted to be movable relative to a workpiece in a manner as to define a gap between a working face of said electrode tool and said workpiece;
    (b) a back-up member for supporting said workpiece and having a recessed area thereon substantially conforming to the shape of said electrode tool working face, said recessed area adapted to be in contact with at least a portion of said workpiece cut away by said electrode tool; and
    (c) means for holding said portion of said workpiece cut away by said electrode tool when said electrode tool working face has penetrated through said workpiece and emerges therefrom into said recessed area of said back-up member, the improvement wherein
    (d) said back-up member includes means for supplying said recessed area with electrolyte fluid under pressure; and wherein
    (e) a plunger member is disposed substantially coaxially within the electrolyte passage of said electrode tool, said plunger member being electrically insulated from said electrode tool and being axially biased with one end applied against said slug and adapted to clamp said slug to said recessed area when said electrode tool working face has penetrated all the way through said workpiece and emerges into said recessed area of said back-up member.

2. In an electrochemical trepanning apparatus, comprising:
    (a) a hollow electrode tool having at least one electrolyte passage therethrough for supplying electrolyte fluid under pressure and adapted to be movable relative to a workpiece in a manner as to define a gap between a working face of said electrode tool and said workpiece;
    (b) a back-up member for supporting said workpiece and having a recessed area thereon substantially conforming to the shape of said electrode tool working face, said recessed area adapted to be in contact with at least a portion of said workpiece cut away by said electrode tool; and
    (c) means for holding said portion of said workpiece cut away by said electrode tool when said electrode tool working face has penetrated through said workpiece and emerges therefrom into said recessed area of said back-up member, the improvement wherein
    (d) said back-up member includes means for supplying said recessed area with electrolyte fluid under pressure; and wherein
    (e) a plunger member is disposed substantially coaxially within the electrolyte passage in said electrode tool, said plunger member being electrically insulated from said electrode tool and being axially biased by spring means with one end applied against said slug and adapted to clamp said slug to said recessed area when said electrode tool working face has penetrated all the way through said workpiece and emerges into said recessed area of said back-up member.

3. In an electrochemical trepanning apparatus, comprising:
(a) a hollow electrode tool having at least one electrolyte passage therethrough for supplying electrolyte fluid under pressure and adapted to be movable relative to a workpiece in a manner as to define a gap between a working face of said electrode tool and said workpiece;
(b) a back-up member for supporting said workpiece and having a recessed area thereon substantially conforming to the shape of said electrode tool working face, said recessed area adapted to be in contact with at least a portion of said workpiece cut away by said electrode tool; and
(c) means for holding said portion of said workpiece cut away by said electrode tool when said electrode tool working face has penetrated through said workpiece and emerges therefrom into said recessed area of said back-up member, the improvement wherein
(d) said back-up member includes means for supplying said recessed area with electrolyte fluid under pressure; and wherein
(e) a plunger member is disposed substantially coaxially within the electrolyte passage in said electrode tool, said plunger member being electrically insulated from said electrode tool and being axially biased by means of a piston member operatively connected to said plunger member, said piston member being disposed in a chamber open to electrolyte fluid under pressure, whereby one end of said plunger member is caused to be applied against said slug and adapted to clamp said slug to said recessed area when said electrode tool working face has penetrated all the way through said workpiece and emerges into said recessed area of said back-up member.

References Cited
UNITED STATES PATENTS 3,058,895  10/1962  Williams  ———————  204—143

JOHN H. MACK, *Primary Examiner.*

R. K. MIHALEK, *Assistant Examiner.*